United States Patent [19]

Miyazawa et al.

[11] Patent Number: 5,667,887
[45] Date of Patent: Sep. 16, 1997

[54] MAGNETO-OPTICAL MEDIA

[75] Inventors: Hiromu Miyazawa; Shinya Ootsuki; Takeo Kawase; Satoshi Nebashi, all of Suwa, Japan

[73] Assignee: Seiko Epson Corporation, Tokyo, Japan

[21] Appl. No.: 85,474

[22] Filed: Jun. 28, 1993

Related U.S. Application Data

[63] Continuation of Ser. No. 613,752, filed as PCT/JP90/00412, Mar. 29, 1990, published as WO90/11602, Oct. 4, 1990, abandoned.

[30] Foreign Application Priority Data

Mar. 28, 1989 [JP] Japan ........................... 1-76117

[51] Int. Cl.$^6$ .................... G11B 5/66; B05D 5/12
[52] U.S. Cl. ................ 428/332; 428/336; 428/694 ML; 428/694 DE; 428/694 MM; 428/694 NF; 428/694 IS; 428/694 XS; 428/694 LE; 428/694 RE; 428/900; 427/127; 427/128; 427/129; 427/130; 427/131; 427/132; 369/13; 369/14
[58] Field of Search ............... 428/694 DE, 694 MM, 428/694 NF, 694 IS, 694 XS, 694 LE, 694 RE, 900, 332, 336, 694 ML; 369/13, 14; 427/127–132

[56] References Cited

U.S. PATENT DOCUMENTS

| | | | |
|---|---|---|---|
| 4,466,035 | 8/1984 | Connell et al. | 360/114 |
| 4,740,947 | 4/1988 | Ohta et al. | 369/286 |
| 4,792,474 | 12/1988 | Murakami et al. | 428/64.7 |
| 4,838,962 | 6/1989 | Takayama et al. | 148/304 |
| 4,939,011 | 7/1990 | Takahashi et al. | 428/65.2 |
| 5,053,287 | 10/1991 | Mizumoto et al. | 428/694 SC |

FOREIGN PATENT DOCUMENTS

| | | |
|---|---|---|
| 139474 | 5/1985 | European Pat. Off. |
| 3623285 | 1/1987 | Germany |
| 107751 | 6/1985 | Japan |
| 76040 | 4/1987 | Japan |
| 197939 | 9/1987 | Japan |
| 226450 | 10/1987 | Japan |
| 285252 | 12/1987 | Japan |
| 171449 | 7/1988 | Japan |
| 173249 | 7/1988 | Japan |
| 031049 | 9/1988 | Japan |
| 316340 | 12/1988 | Japan |
| 317945 | 12/1988 | Japan |

OTHER PUBLICATIONS

Journal of Applied Physics, vol. 57, No. 8, Apr. 1985, Woodbury, NY, pp. 3891–3893, "Computation of Optical Properties of Multilayered Media for Magnetooptical Memories".
SPIE vol. 421 entitled "Optical Disks Systems and Applications" authored by Alan B. Marchant.

*Primary Examiner*—Leszek Kiliman
*Attorney, Agent, or Firm*—Mark P. Watson

[57] ABSTRACT

The present invention relates to a magneto-optical media. More particularly, the present invention relates to a device for assuring a high S/N ratio by controlling the optical phase difference of the media by optimizing the film structure of a multi-layered thin film. The structure of the multi-layered thin film is such that the first protective film of a thickness between 400 Å and 700 Å, a recording film of a thickness between 150 Å and 300 Å, the second protective film of a thickness between 150 Å and 250 Å, and a reflecting film of a thickness between 400 Å and 800 Å, are successively laminated on a substrate. The first protective layer and the second protective layer are both suitably made of AlSiN, SiN, or SiO$_2$ having refractivity between 1.95 and 2.05. The recording layer has a composition:

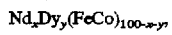

or

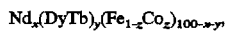

where
25 at % $\leq$ x+y $\leq$ 30 at %,
0 at % $\leq$ x $\leq$ 8 at %, and
0.07 at % $\leq$ z $\leq$ 0.43 at %.

18 Claims, 11 Drawing Sheets

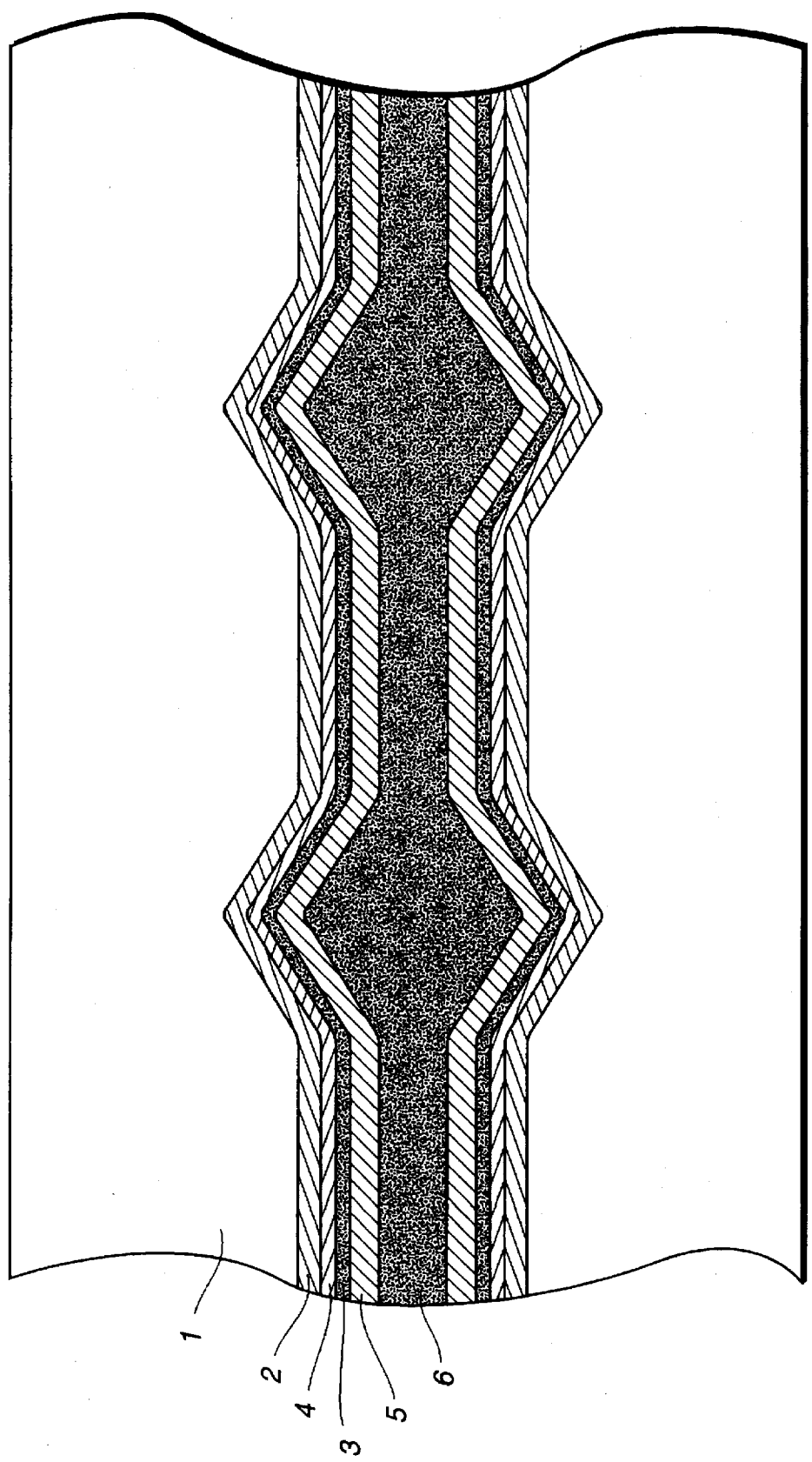
FIG._1

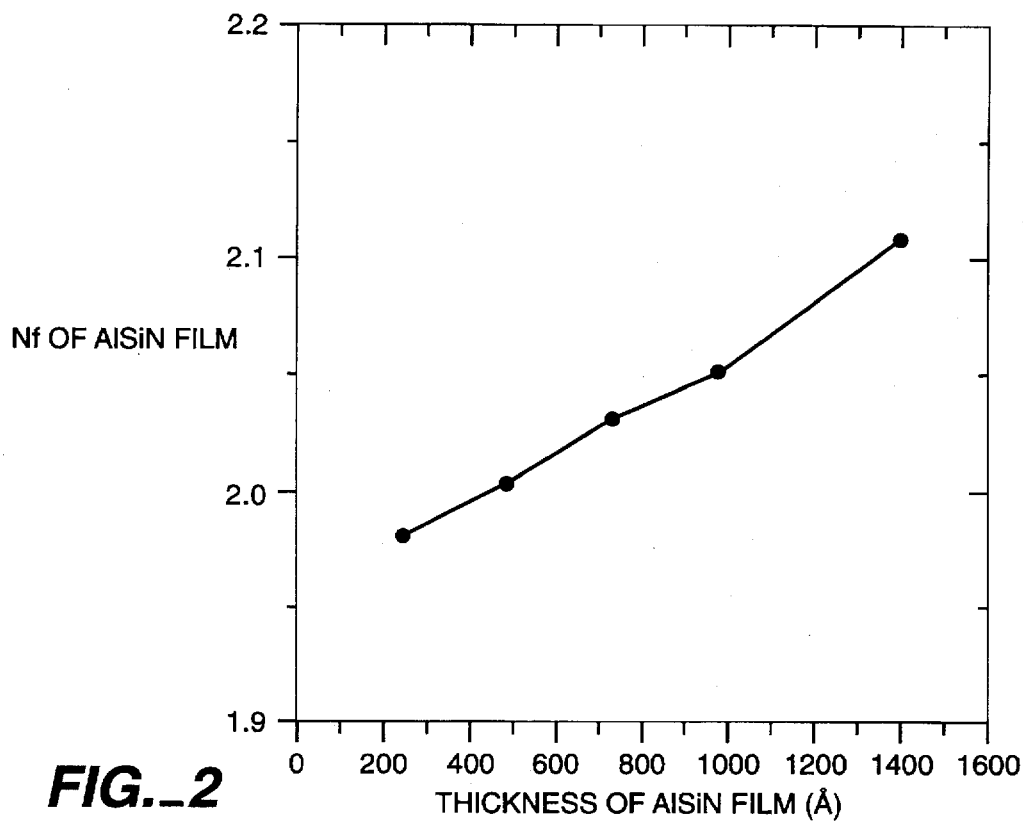
FIG._2
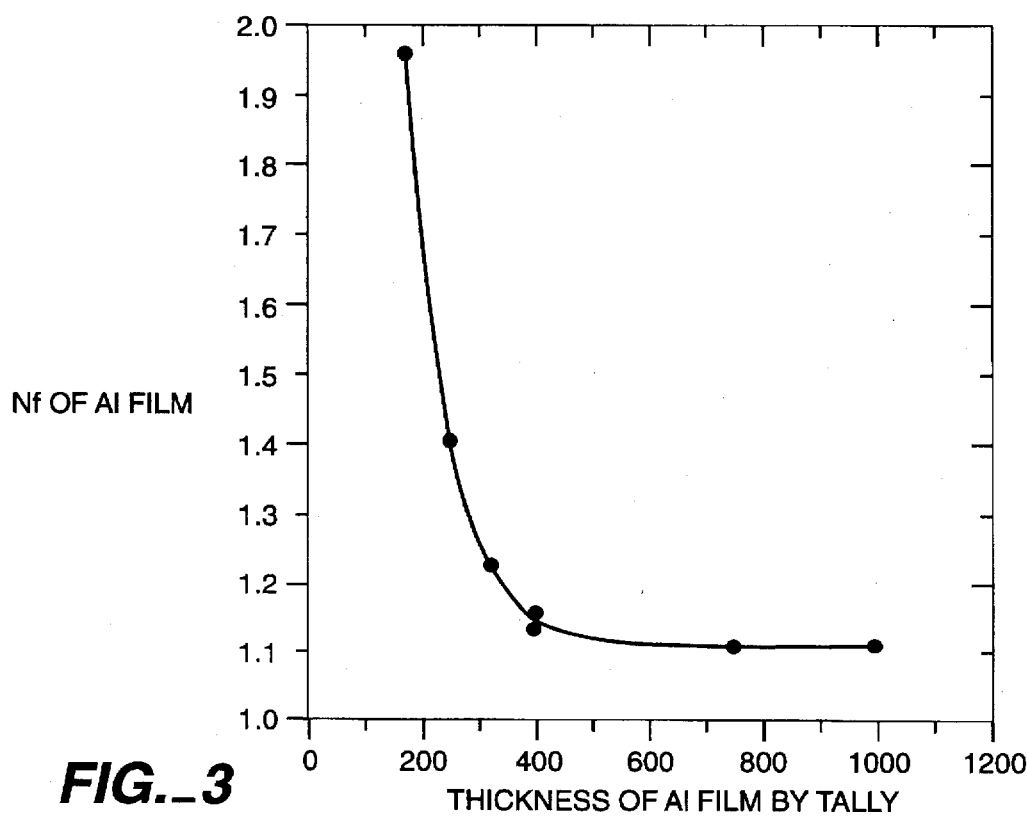
FIG._3

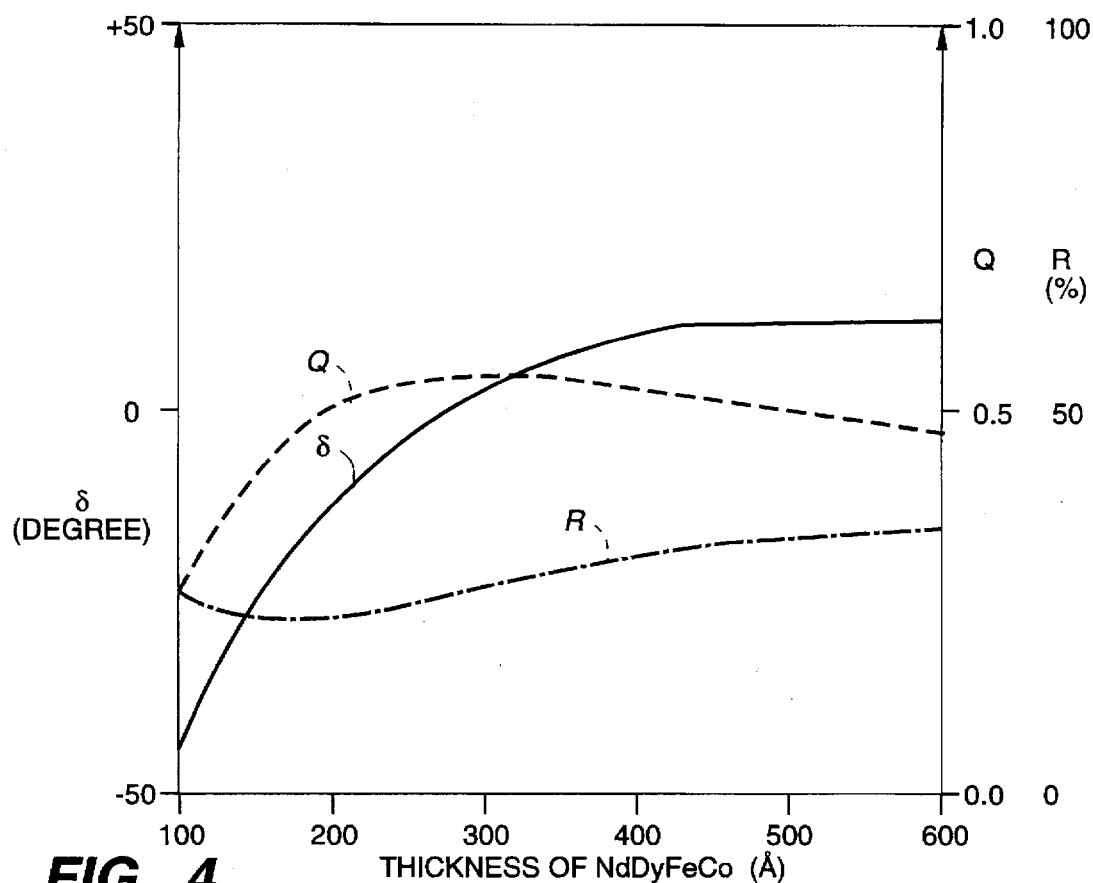
FIG._4
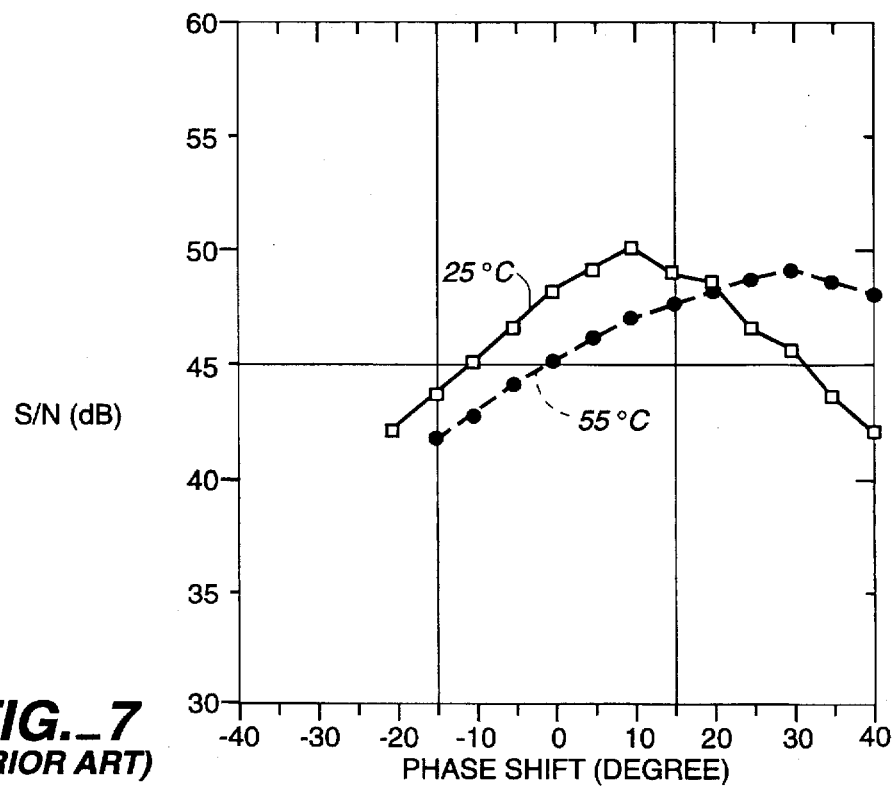
FIG._7
(PRIOR ART)

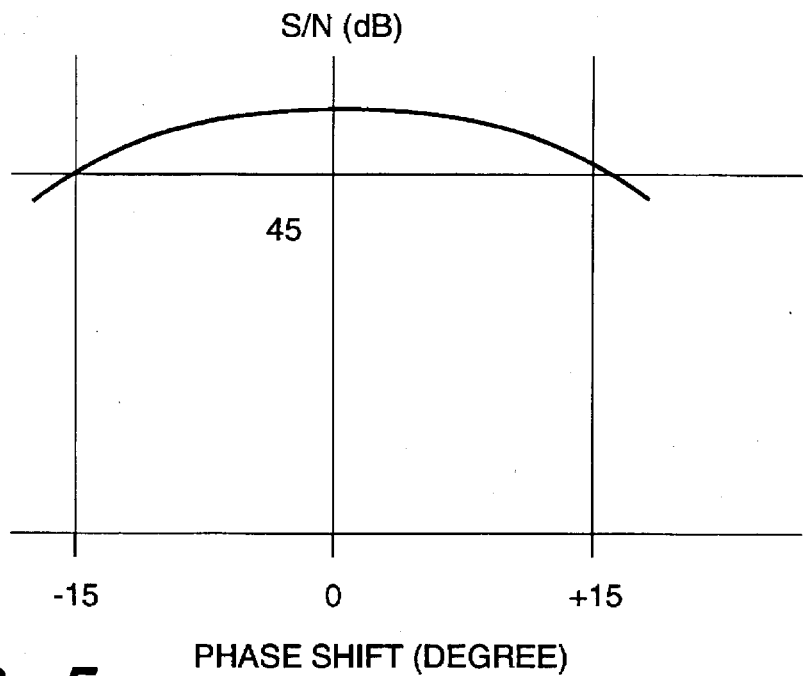
FIG._5
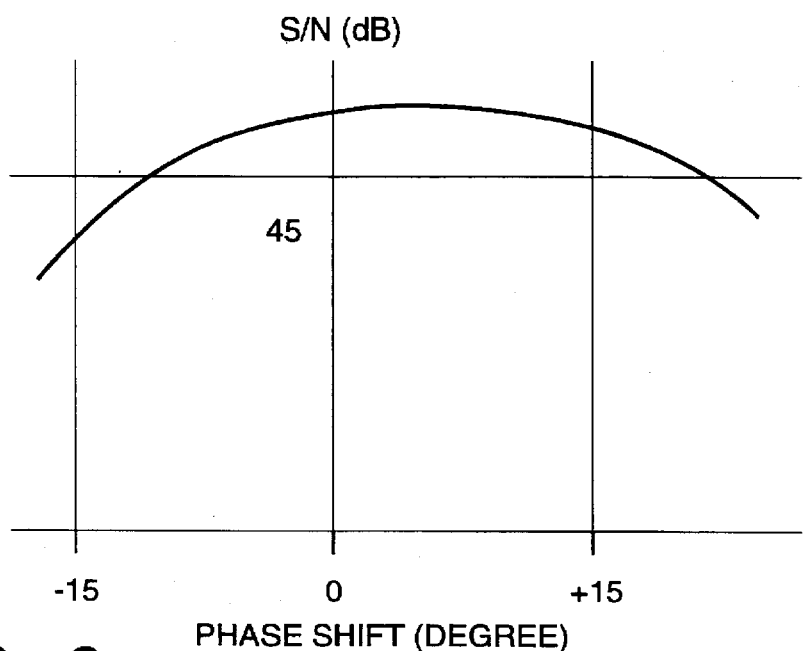
FIG._6
*(PRIOR ART)*

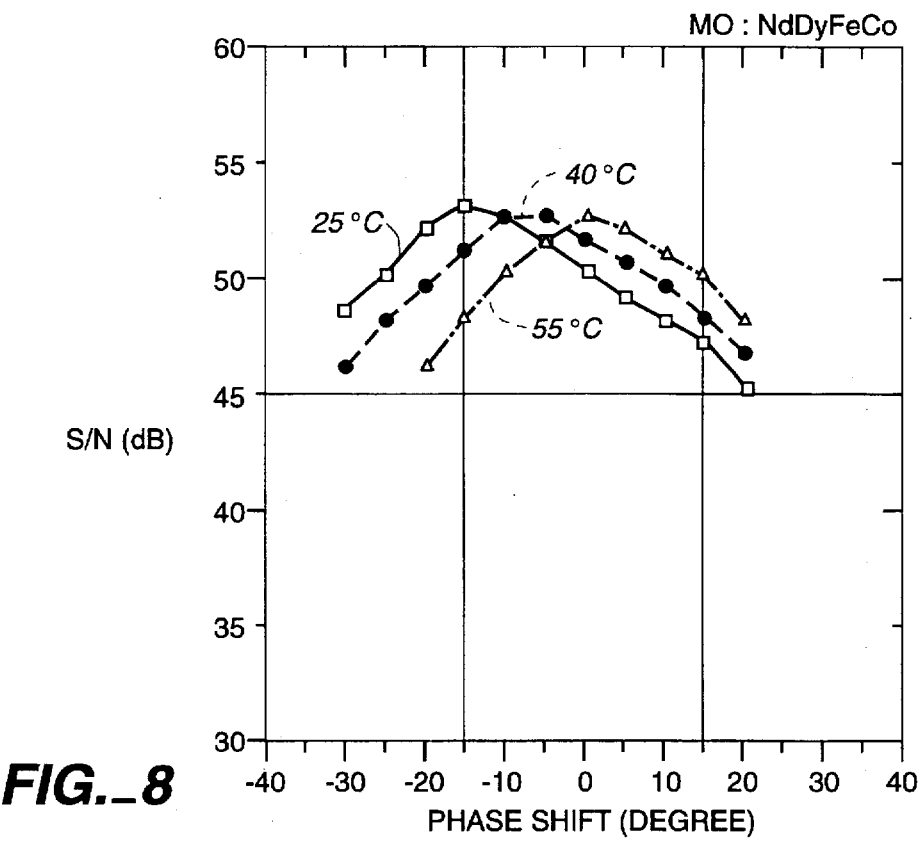
FIG._8
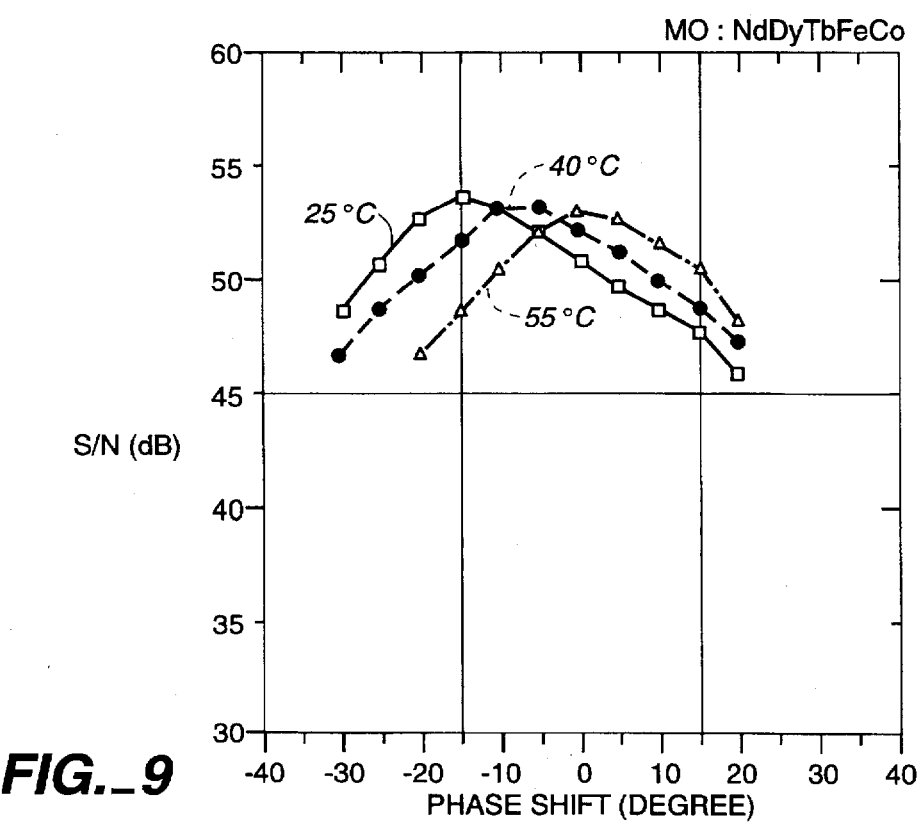
FIG._9

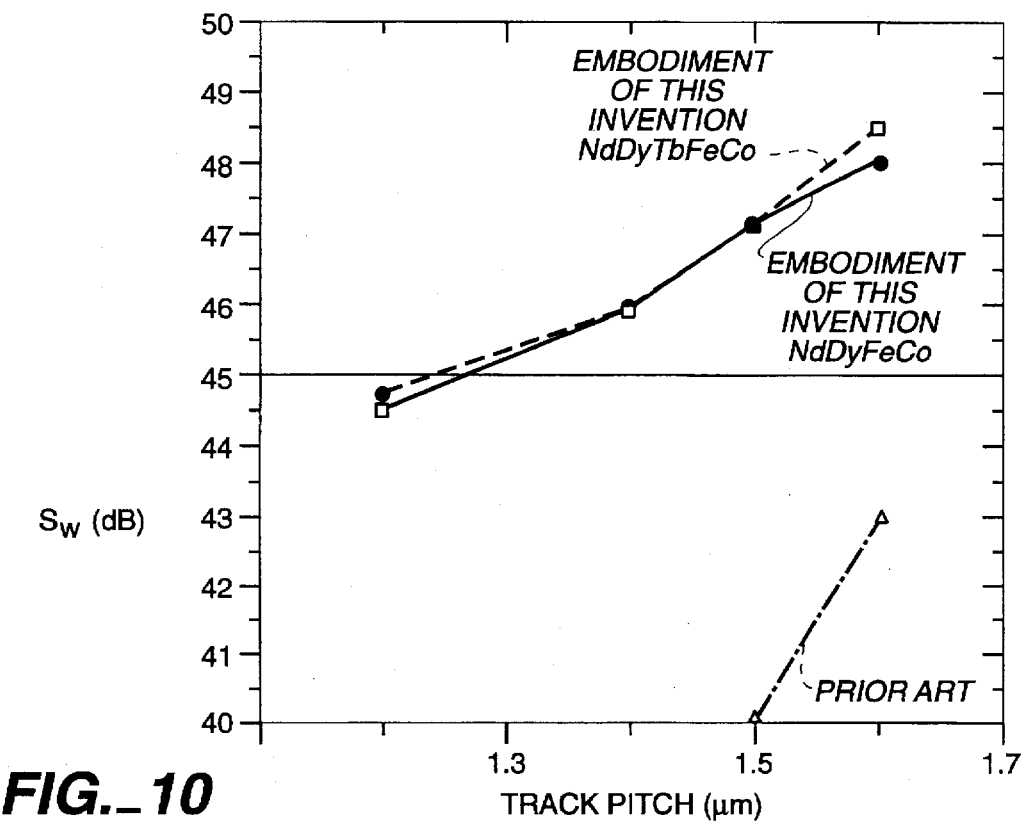
FIG._10
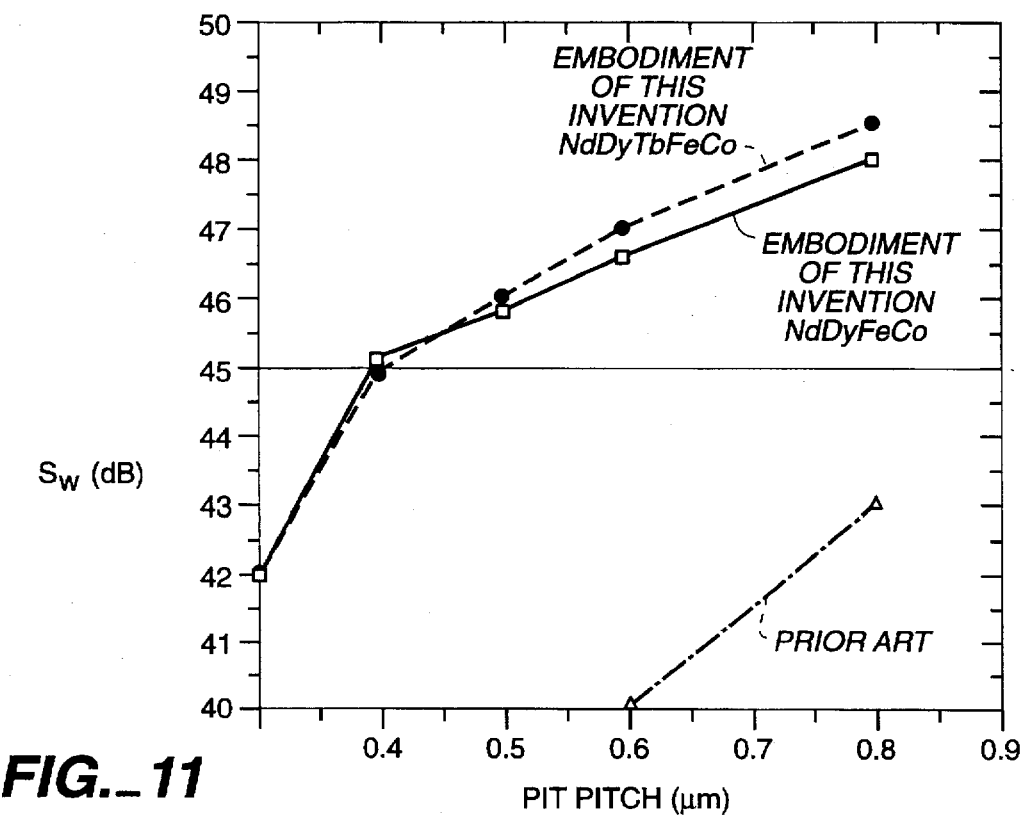
FIG._11

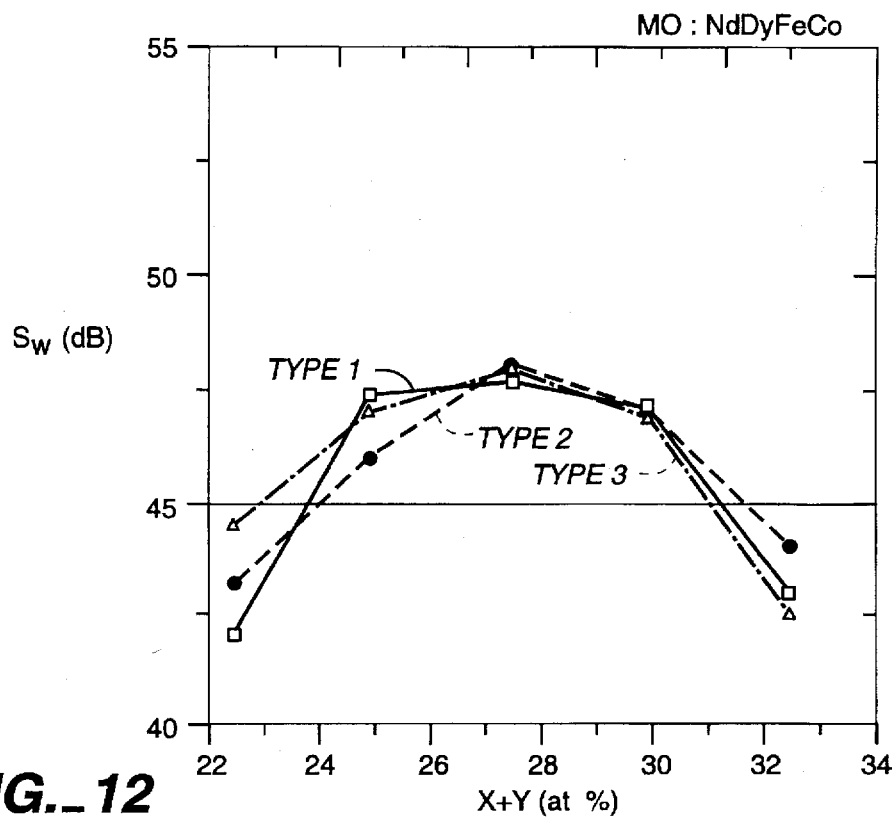
FIG._12
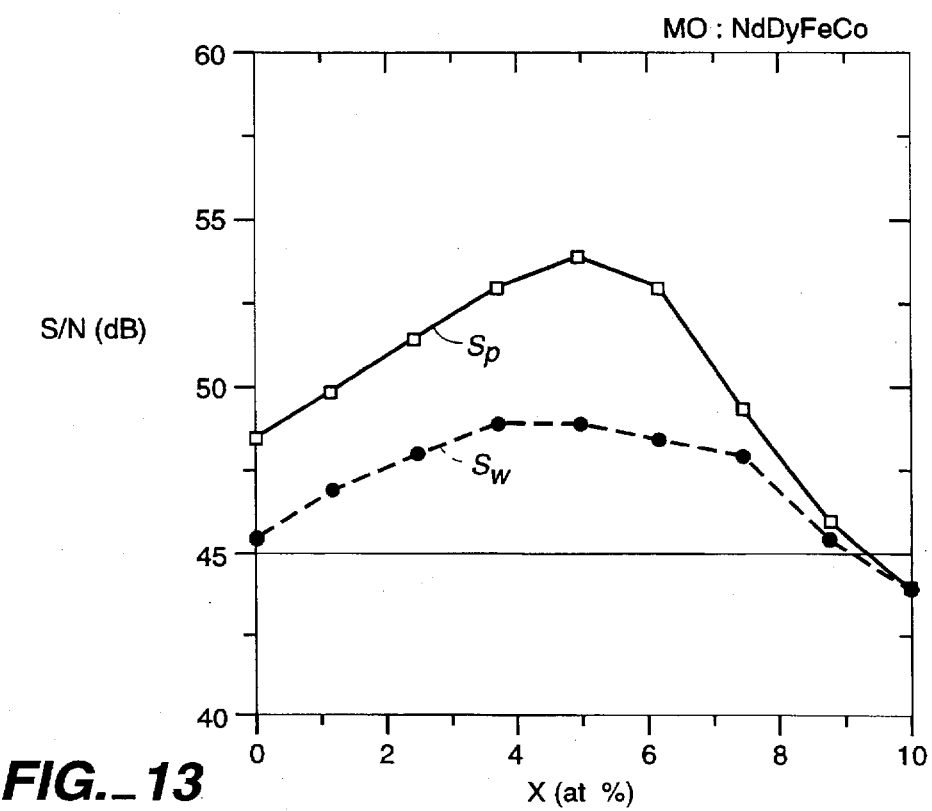
FIG._13

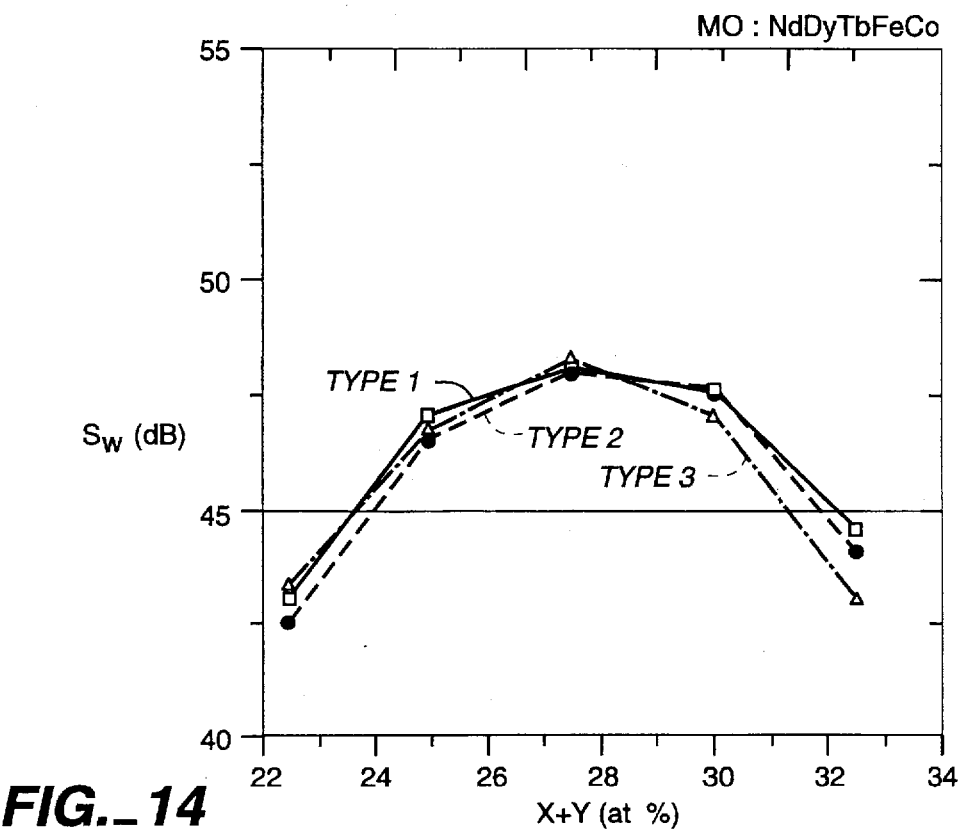
FIG._14
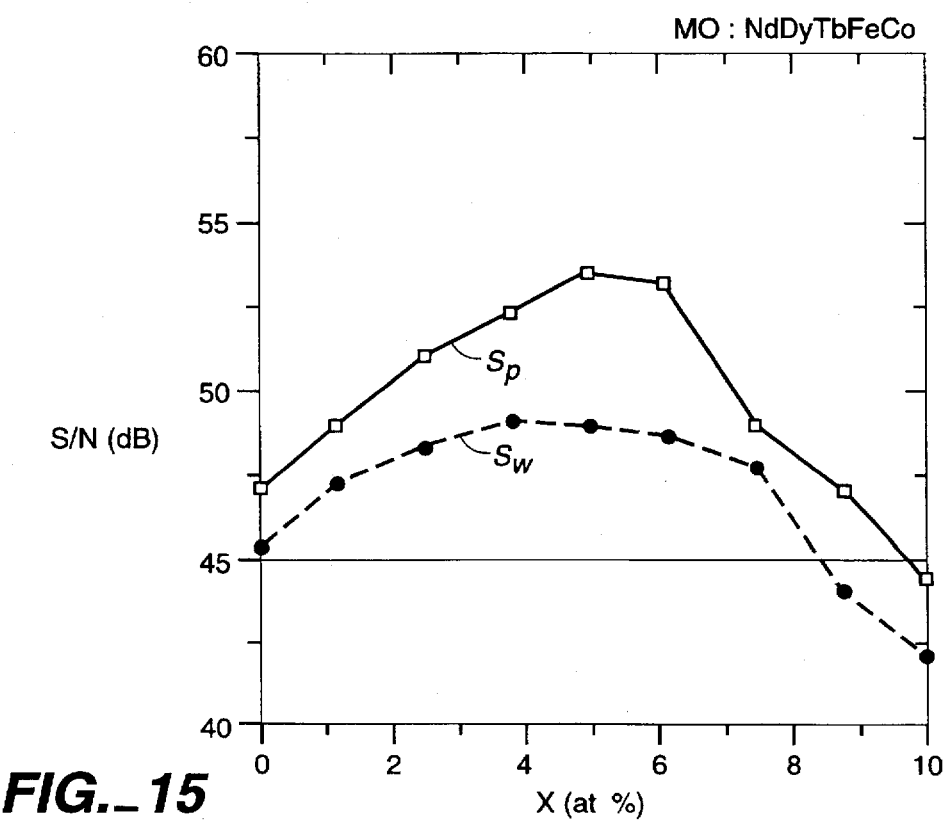
FIG._15

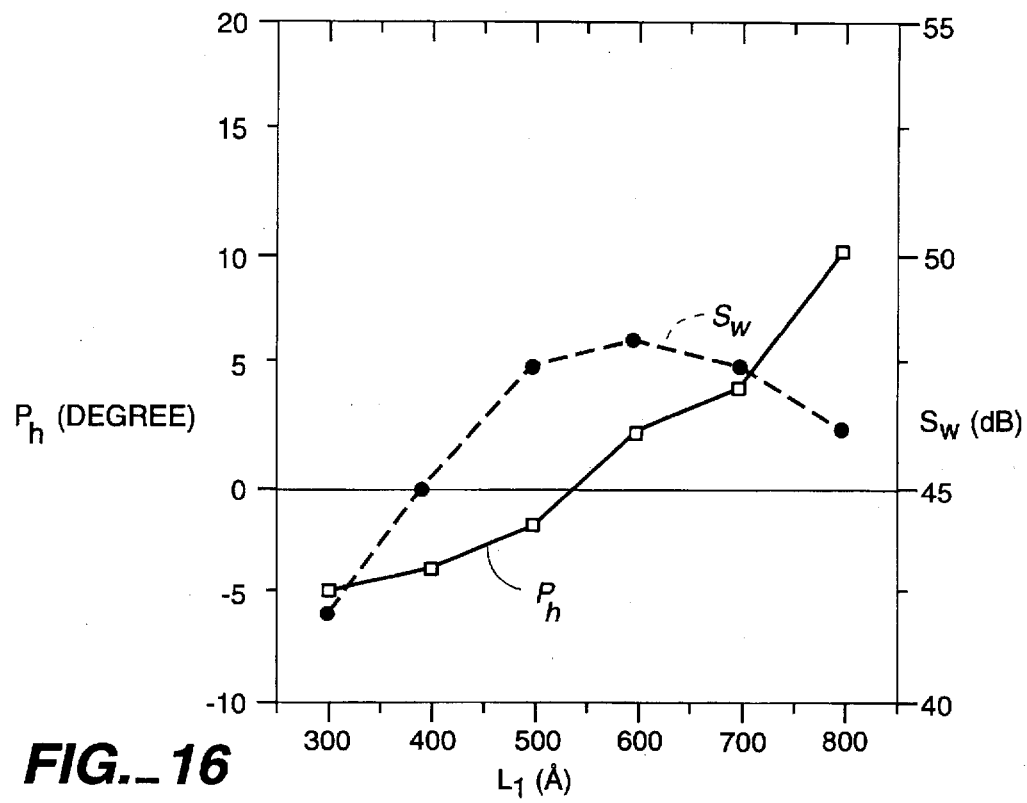
FIG._16
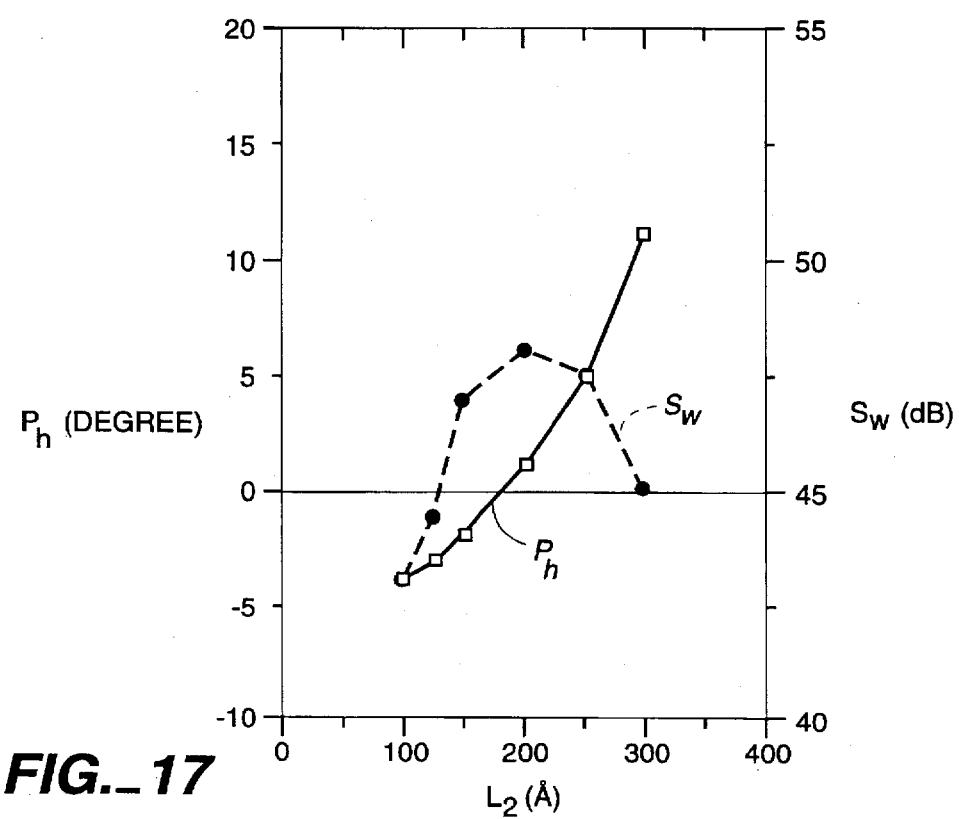
FIG._17

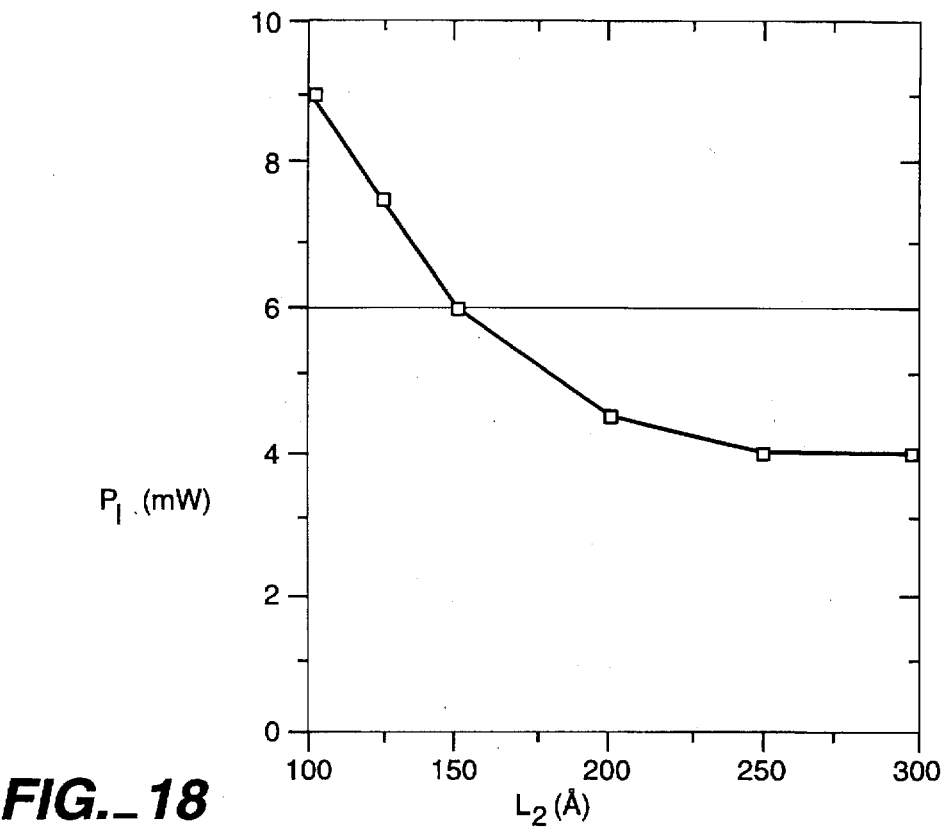
FIG._18
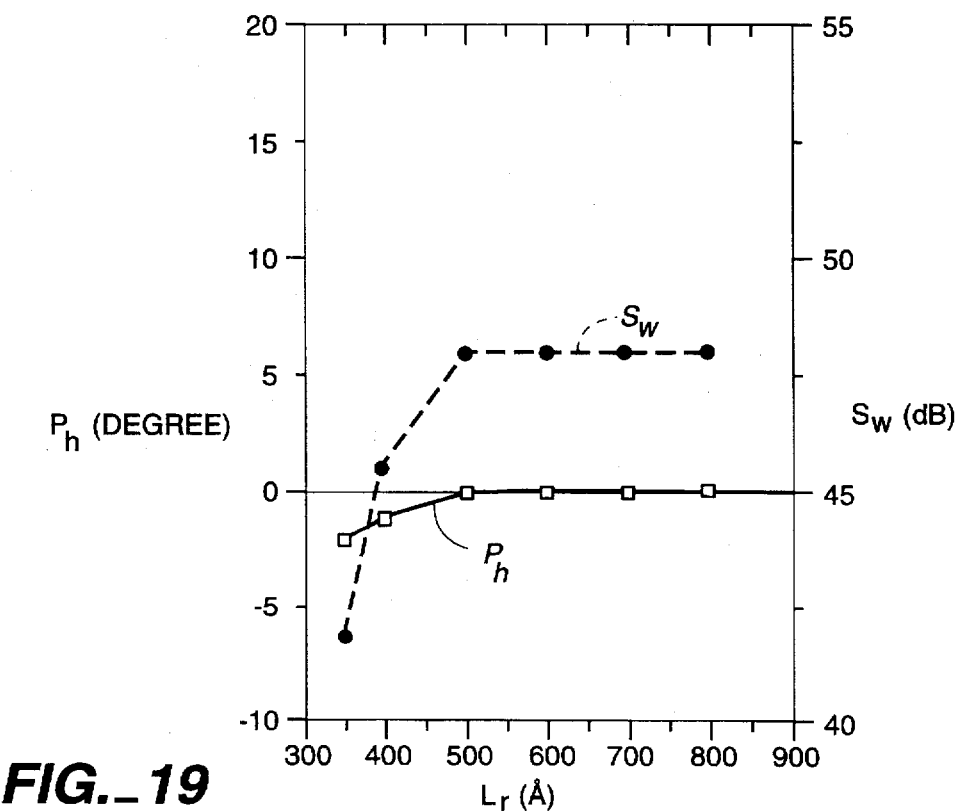
FIG._19

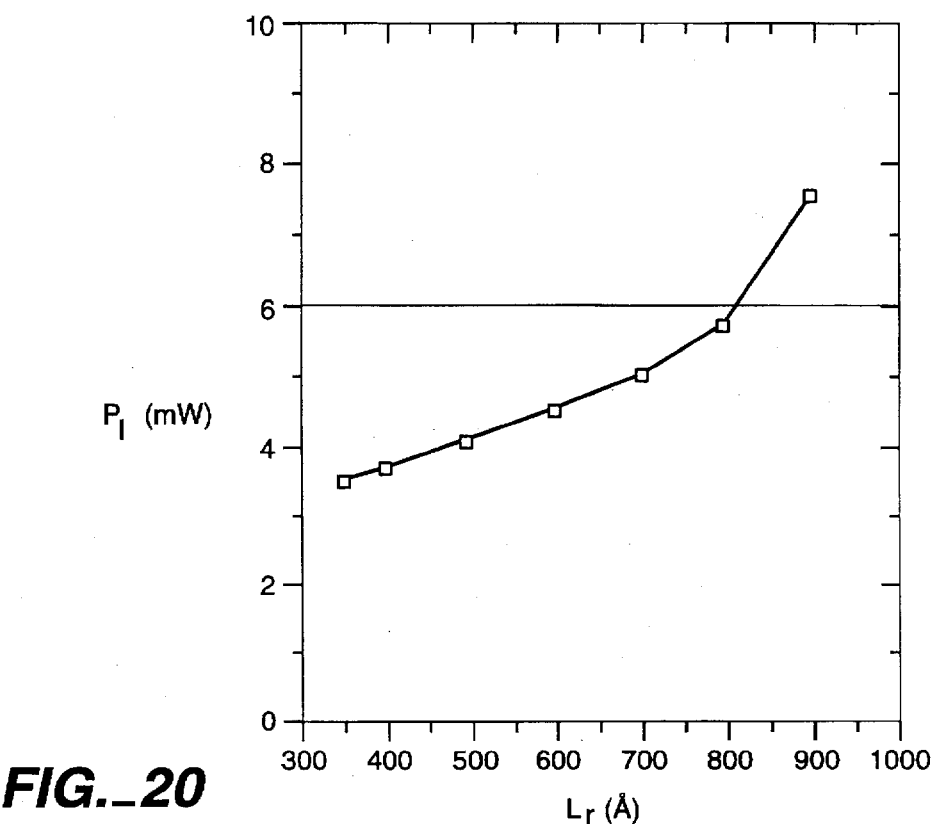
FIG._20
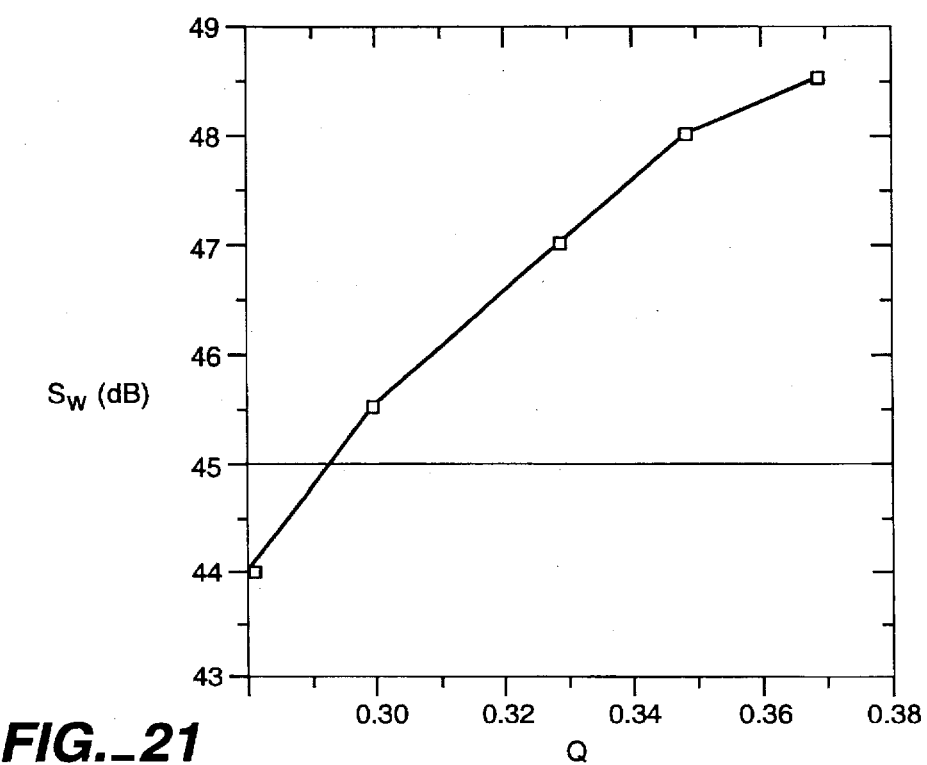
FIG._21

MAGNETO-OPTICAL MEDIA

This is a continuation of an application Ser. No. 07/613,752, filed as PCT/JP90/00412, Mar. 29, 1990, published as WO90/11602, Oct. 4, 1990, now abandoned.

BACKGROUND OF THE INVENTION

The present invention relates to an magneto-optical media for effecting reading out signals by utilizing the magneto-optical effect (Kerr effect).

In a conventional magneto-optical media, as can be seen in the disclosure of the Japanese Patent Application No. 27458/87, there has been such consideration that, in the Kerr effect read-out system by utilizing the reflected light from a magneto-optical media, the signal versus noise ratio (S/N ratio) is proportional to log (θ·R) (where θ denotes a Kerr rotation angle and R the rate of the reflected light), and the optimization of the refractive index and the film thickness of each thin film layer has been carried out with respect to S/N ratio, the protective characteristics, heat conducting characteristics, etc.

However, in a mass-produced magneto-optical head, since the phase difference between P polarized light and S polarized light has at worst the fluctuation of about ±15 degrees, a suitable S/N ratio cannot be obtained when the Kerr effect read-out is carried out even in a magneto-optical media most suitably designed by using the conventional technology. Therefore, the present invention intends to solve such a problem, and provides a magneto-optical media most suitably formed in such a manner that a S/N ratio is sufficient to enable high density recording and reading at the environmental temperature in a mass-produced drive.

SUMMARY OF THE INVENTION

According to the invention, a magneto-optical media for recording and reading out is formed on a transparent substrate on which a first protective layer, a recording layer, a second protective layer and a reflecting layer are successively laminated in this order. A high S/N ratio is obtained by controlling the optical phase difference of the media through optimizing the film structure of the multi-layered film. In one embodiment, the film structure is optimized in such a way that at an internal working temperature of the drive within a predetermined range, the absolute value of the phase difference of the media is not greater than five degrees. In another embodiment, the film structure is optimized to preset the phase difference of the media to a predetermined value in anticipation of the shift caused by an increase in the internal working temperature of the drive so that when the drive operates at a maximum internal working temperature, the phase difference of the media is substantially equal to zero. In a further embodiment the structure of the multi-layered thin film is such that a first protective film of a thickness between 400 Å and 700 Å, a recording film of a thickness between 150 Å and 300 Å, a second protective film of a thickness between 150 Å and 250 Å, and a reflecting film of a thickness between 400 Å and 800 Å, are successively laminated on a substrate. The first protective layer and the second protective layer are both suitably made of AlSiN, SiN, or $SiO_2$ having refractivity between 1.95 and 2.05. The recording layer has a composition:

$Nd_xDy_y(FeCo)_{100-x-y}$, or $Nd_x(DyTb)_y(Fe_{1-z}Co_z)_{100-x-y}$, where:

25 at %$\leq$x+y$\leq$30 at %, 0 at %$\leq$x$\leq$8 at %, and 0.07 at %$\leq$z$\leq$0.43 at %.

BRIEF EXPLANATION OF THE DRAWINGS

FIG. 1 is a cross-sectional view of an embodiment of the magneto-optical media according to the present invention;

FIG. 2 shows the refractivity versus the film thickness of AlSiN;

FIG. 3 shows the refractivity versus the film thickness of Al;

FIG. 4 illustrates the optimization of the film constitution;

FIG. 5 is the S/N ratio of the magneto-optical media according to the present invention versus the fluctuation of the phase difference of the mass-produced magneto-optical heads;

FIG. 6 shows the S/N ratio of the magneto-optical media according to the conventional technology versus the fluctuation of the phase difference of the mass-produced magneto-optical heads;

FIG. 7 shows that the change of the S/N ratio of the magneto-optical media produced by the conventional technology when the media is read by changing the phase difference of the magneto-optical head at the environmental temperatures of 25° C. and 55° C.;

FIG. 8 shows the change of the S/N ratio in embodiment 2 of the invention when the magneto-optical media including NdDyFeCo as the recording layer is read by changing the phase difference of the magneto-optical head at the environmental temperatures of 25° C., 40° C., and 55° C.;

FIG. 9 shows the change of the S/N ratio in embodiment 2 of the invention when the magneto-optical media including NdDyTbFeCo as the recording layer is read by changing the phase difference of the magneto-optical head at the environmental temperatures of 25° C., 40° C., and 55° C.;

FIG. 10 shows the minimum S/N ratio $S_w$, at the phase difference between ±15 degrees when the track pitch of the magneto-optical media is changed using the conventional technology and in embodiment 2 of the invention, respectively;

FIG. 11 shows the change of the minimum S/N ratio $S_w$, at the phase difference between ±15 degrees when the interval of the shortest recording pit pitch of the magneto-optical media is changed using the conventional technology and in embodiment 2 of the invention, respectively;

FIG. 12 shows the change of the minimum S/N ratio $S_w$, at the phase difference between ±15 degree when the composition ratio x+y (at %) of the rare earths contained in the recording film is changed in the thin film constituting types 1, 2, and 3 of embodiment 3 of the invention in which NdDyFeCo is used;

FIG. 13 shows the change of the minimum S/N ratio $S_w$, at the phase difference between ±15 degrees and the S/N ratio $S_p$ at the phase difference 0 degree when the composition ratio x (at %) of Nd contained in the recording film is changed in the thin film constituting types 1, 2, and 3 of embodiment 3 of the invention in which NdDyFeCo is used;

FIG. 14 shows the change of the minimum S/N ratio $S_w$, at the phase difference between ±15 degree when the composition ratio x+y (at %) of the rare earths contained in the recording film is changed in the thin film constituting types 1, 2, and 3 of embodiment 3 of the invention where NdDyTbFeCo is used;

FIG. 15 shows the change of the minimum S/N ratio $S_W$ at the phase difference between ±15 degrees and the S/N ratio $S_p$ at the phase difference of 0 degree when the composition ratio x (at %) of Nd contained in the recording film is changed in the thin film constituting types 1, 2, and 3 of embodiment 3 of the invention where NdDyTbFeCo is used;

FIG. 16 shows the change of the phase difference $P_h$ which gives the peak S/N ratio and the minimum S/N ratio $S_W$ at the phase difference between ±15 degrees when the thickness $L_1$ of the first protective film is changed in embodiment 4 of the invention;

FIG. 17 shows the change of the phase difference $P_h$ which gives the peak S/N ratio and the minimum S/N ratio of $S_W$ between ±15 degrees when the thickness $L_2$ of the second protective film is changed in embodiment 5 of the invention;

FIG. 18 shows the change of the laser power $P_1$ when the S/N ratio reaches 45 dB when the thickness $L_2$ of the second protective film is changed in embodiment 5 of the invention;

FIG. 19 shows the change of the phase difference $P_h$ which gives the peak S/N ratio and the minimum S/N ratio $S_W$ between ±15 degrees when the thickness $L_r$ of the reflecting film is changed in embodiment 6 of the invention;

FIG. 20 shows the change of the laser power $P_1$ when the S/N ratio reaches 45 dB when the thickness $L_r$ of the reflective film is changed in embodiment 6 of the invention;

FIG. 21 shows the relationship between Q and $S_W$ in embodiment 7 of the invention;

DESCRIPTION OF THE PREFERRED EMBODIMENTS

[Embodiment 1]

FIG. 1 is a cross-sectional view of an embodiment of the magneto-optical disk according to the present invention.

In FIG. 1, a transparent substrate 1 such as that made of glass, acrylic resin, PC (polycarbonate) resin, or similar types of materials has a thickness of about 1.2 mm. Transparent thin films 2 and 3 are made of AlSiN (aluminum silicon nitride) and used as protective layers. A magnetic thin film 4 has an easily magnetizable axis perpendicular to the film surface. Film 4 is made of NdDyFeCo, TbFeCo, DyFeCo, or similar types of materials and is used as a recording layer. A reflecting layer 5 is made of Al. An adhesive layer 6 is made of epoxy resin, hot melt adhesive agent, or similar types of materials for pasting two counterposing magneto-optical disks together. The refractivity of substrate 1 is 1.5, and each of the protective layers has a refractivity depending on the respective film thickness as shown in FIG. 2. Reflecting layer 5 has a refractivity depending on its film thickness as shown in FIG. 3. The light impinging through substrate 1 passes through protective layer 2 the component reflected at the interface between protective layer 2 and recording layer 4 and the component transmitted through recording layer 4 and the protective layer 3 and reflected at reflecting layer 5 interferes with each other, and the Kerr rotation angle increases. The laser wavelength of the light source in the present embodiment is 825 nm. The calculation of the reflectivity (R), phase difference (δ), and characteristic index (Q) for the various recording film thickness described above are shown in FIG. 4. The optimization of the film constitution can be achieved by repeating the calculation described above. However, one must preserve a suitable reflectivity, protecting effect, and recording sensitivity.

As a first example of the film constitution formed by optimization described above, a magneto-optical media is formed as shown in FIG. 1 and has the following constitution: substrate 1 is made of PC resin having a thickness of 1.2 mm, the thickness of protective layer 2 made of AlSiN is between 400 Å and 700 Å, the thickness of recording layer made of NdDyFeCo is between 250 Å and 300 Å, the thickness of protective layer 3 made of AlSiN is between 200 Å and 300 Å, and the thickness of the reflecting layer 5 made of Al is between 500 Å and 700 Å. Here, AlSiN is used as the protective layer and is much better than SiN and $SiO_2$ in respect of the protecting effect and heat conducting characteristics. NdDyFeCo is used as the recording layer and has the read characteristics equal to those of TbFeCo. Moreover, recording can be carried out at a lower magnetic field with respect to NdDyFeCo than with respect to TbFeCo, and NdDyFeCo is cheaper.

Magneto-optical heads have a phase difference between the polarized light (P polarized light) in the same direction as that of the impinging polarized light and the polarized light (S polarized light) perpendicularly intersecting with the P polarized light. The phase difference is at worst about ±15 degrees, and even in this range of fluctuation, the high S/N ratio of the magneto-optical disk must be provided. Therefore, in the magneto-optical disk having the above constitution, a babinet soleile plate is used in a magneto-optical head to let the head intentionally have a phase difference to measure the S/N ratio. The result is shown in FIG. 5. In FIG. 5, the abscissa shows the phase difference due to the babinet soleile plate, and the ordinate shows the resulting S/N ratio. It has been empirically determined that the phase difference of the magneto-optical media has a value which gives the maximum S/N ratio. In FIG. 5, the peak position of the S/N ratio is present just at the position where the phase difference is at 0 degree, which is also the value of the phase difference of the media, and even if the internal phase difference of the mass-produced magnetic-optical head fluctuates between about ±15 degrees, a sufficient S/N ratio can be obtained. In FIG. 6, the results of the same experiment for a magnetic-optical disk having a film constitution designed by the conventional technology are shown. In FIG. 6, when the internal phase difference of the magnetic-optical head is in the range of 0 degree to +15 degrees, a sufficient S/N ratio can be obtained, but when the magnetic-optical head has an internal phase difference of −15 degrees, a sufficient S/N ratio cannot be obtained.

[Embodiment 2]

In an actual magneto-optical drive, the internal temperature at the time of operation reaches 50° C. to 60° C. due to the heat evolution of the circuit and the coil of the actuator. Under such a high temperature the phase difference of the magneto-optical media changes due to the influence of the birefringent of the substrate. Therefore, a magneto-optical media should be designed optically in such a manner that the phase difference is at 0 degree even under a high temperature. FIG. 7 shows the results of measurement of the S/N ratio of the magneto-optical media designed by the conventional technology by using a babinet soleile plate in the magneto-optical head to let the head intentionally have a phase difference. Although the peak position of the S/N ratio is at the phase difference of 10 degree at 25° C., the peak of the S/N ratio is shifted to be at a phase difference of 35 degrees at 55° C. Therefore, a media film must be designed in consideration of the amount of peak shift at high temperature. In order that the peak of the S/N ratio is at the phase difference of 0 degree at high temperature, the peak of the S/N ratio at 25° C., i.e., the room temperature, is preset on the minus side of the phase difference axis in such a manner as to offset the shift at high temperature. It can be seen in FIG. 4 the presetting of the peak S/N ratio can be achieved by making film thickness of the recording film less than 250 Å. However, from FIG. 4, it is not preferable that the characteristic index Q becomes remarkably low when the film thickness of the recording film becomes lower than 125 Å. Also, the thickness of the other layers must by optimized to preserve suitable reflectivity, protective effect, and recording sensitivity.

As a second example of the film constitution optimized by considering the phase difference under high temperature, a magneto-optical media is formed as shown in FIG. 1. Substrate 1 is made of PC resin having a thickness of 1.2 mm. The thickness of protective layer 2 made of AlSiN is between 400 Å and 700 Å. The thickness of recording layer 4 made of NdDyFeCo is between 125 Å and 250 Å. The thickness of protective layer 3 made of AlSiN is between 150 Å and 250 Å. The thickness of reflecting layer 5 made of Al is between 400 Å and 800 Å. FIG. 8 shows the S/N ratio when the magneto-optical media is read by changing the phase difference of the magneto-optical head. The environmental temperature at the time of reading is a variable in the range between 25° C. to 55° C. At 55° C. it is shown that the peak position of the S/N ratio corresponds to the phase difference of 0 degree, which is also the phase difference of the media. Moreover, when the environmental temperature is in the range of between 25° C. to 55° C. and the fluctuation of the phase difference of the magneto-optical head in a mass-produced drive is in the range between −15 degrees to +15 degrees, the S/N ratio is always above the 45 dB as required for sufficient signal quality. Here, AlSiN is used as the protective layer and is much better than SiN and SiO$_2$ in terms of the protective effect and the heat conductive characteristics. NdDyFeCo is used as the recording layer and has the same Kerr read out characteristics as those of TbFeCo. Moreover, with NdDyFeCo one can record at a lower magnetic field than required for TbFeCo, and NdDyFeCo is cheaper.

In the second example described above, if the recording layer is made of NdDyTbFeCo having a thickness between 125 Å to 250 Å, the same results can be obtained. FIG. 9 shows the S/N ratio in this alternative environment. It is shown that, in the temperature range between 25° C. to 55° C., the S/N ratio of 45 dB is obtained when the phase difference of the magneto-optical head is in the range between +15 degrees to −15 degrees.

In the second example described above, if the magneto-optical recording film is made of either NdDyFeCo or NdDyTbFeCo, the same results can be obtained when the reflecting film is made of an aluminum alloy such as AlTi, AlCr, AlTa, etc.

The maximum memory capacity in a disk is determined by the density of the recording bits. When the recording density is increased, the advantages of the invention over the conventional technology are shown.

FIG. 10 shows the change of the S/N ratio when the recording density is increased in the radial direction of the disk. The track pitch is shortened in order to increase the recording density. The disk is a single plate in order to realize the overwriting of the magnetic field modulation system. The interval of the recording bits is 0.76 micron. Recording is carried out at a linear velocity of 20 m/sec, with a laser power of 7 mW and under a bias magnetic field of 150 Oe by the magnetic field modulation. The recording and reading are carried out under the environment of 55° C. In FIG. 10, $S_w$, the minimum S/N ratio within ±15 degrees is taken in the ordinate. As is clear from FIG. 10, even the media of the present embodiment has a track pitch of 1.3 micron, more than 45 dB can be obtained within ±15 degrees of the fluctuation of the phase difference of the head.

FIG. 11 shows the change of the S/N ratio when the recording density is increased in the tangential direction of the disk. In order to increase the recording density, the pitch of the shortest pit is shortened. The track pitch at this time is 1.6 microns. The disk is a single plate in order to realize the overwriting of the magnetic field modulation system. The recording is carried out at a linear velocity of 20 m/sec, with a laser power of 7 mW, and under the bias magnetic field of 150 Oe by the magnetic field modulation. Recording and reading are carried out under the environment of 55° C. In FIG. 11, $S_w$, the minimum S/N ratio within ±15 degrees is taken in the ordinate.

FIG. 11 shows that the media of the invention provides a S/N ratio of more than 45 dB under the condition of 0.4 micron pit pitch.

From FIGS. 10 and 11, it is clear that the media of the invention is better than the media designed by the conventional technology with respect to improving the recording density.

In embodiment 2, AlSiN used for the protective layers 2 and 3 has a refractivity between 1.95 and 2.05, and when it is represented as:

$$(Al_x Si_{100-x})N$$

x is expressed by:

0 at % ≤ x ≤ 95 at %.

More preferable composition range is as follows:

10 at % ≤ x ≤ 50 at %.

[Embodiment 3]

The thin film multi-layer structure of the magneto-optical media is one of the three types shown in Table 1. In each type the composition of the recording layer is changed. The layers are laminated on a transparent substrate in the following order: the first protective film, the recording film, the second protective film, and the reflecting film.

The first protective film and the second protective film are both made of AlSiN.

TABLE 1

|  | Type 1 | Type 2 | Type 3 |
|---|---|---|---|
| First protective film | 600 | 600 | 600 |
| Recording film | 150 | 180 | 220 |
| Second protective film | 200 | 200 | 200 |
| Reflecting film | 600 | 600 | 600 |

The unit is in Å

Signals are written and read relative to the magneto-optical media.

In a read process, the phase difference of the head is intentionally shifted away from 0 degree by the use of the babinet soleile plate in the magneto-optical head. When the composition of the recording layer is represented by:

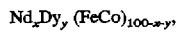

$$Nd_x Dy_y (FeCo)_{100-x-y},$$

the relationship between the composition ratio x+y of rare earths and the minimum S/N ratio, $S_w$, within ±15 degrees phase difference of the head at the environmental temperature of 55° C. is shown in FIG. 12.

When the composition ratio is:

$$25 \text{ at \%} \leq x+y \leq 30 \text{ at \%},$$

$S_w$ is more than 45 dB for any type of structure in Table 1.

Also, the relationship between of x when x+y is 28 at % and the S/N ratio $S_p$ at 0 degree phase difference of the head is shown in FIG. 13. The environmental temperature is 55° C. In FIG. 13, the minimum S/N ratio $S_w$ within ±15 degrees phase difference of the head is also shown. From FIG. 13, it is shown that when:

$$0 \text{ at \%} \leq x \leq 8 \text{ at \%}$$

a S/N ratio of more than 45 dB is assured at a phase difference in the range of ±15 degrees. This range of x holds good when x+y is between 25 at % and 30 at %.

When the composition of the recording layer is represented by:

$$Nd_x (Dy\ 0.74\ Tb\ 0.26)_y (FeCo)_{100-x-y},$$

the relationship between the composition ratio x+y of rare earths and the minimum S/N ratio $S_w$ within the ±15 degree phase difference of the head at the environmental temperature of 55° C. is shown in FIG. 14.

When the composition ratio is:

$$25 \text{ at \%} \leq x+y \leq 30 \text{ at \%},$$

$S_w$ is more than 45 dB for any type of structure in Table 1.

Also, when x+y is 28 at %, the relationship between x and the S/N ratio $S_p$ at 0 degree phase difference of the head is shown in FIG. 15. The environmental temperature is 55° C. In FIG. 15, the minimum S/N ratio $S_w$ within ±15 degrees phase difference of the head is also shown.

From FIG. 15, it is shown that, when:

$$0 \text{ at \%} \leq x \leq 8 \text{ at \%},$$

a S/N ratio of more than 45 dB is assured at a phase difference in the range of ±15 degrees. This range of x holds good when x+y is between 25 at % to 30 at %. Here, the ratio between Dy and Tb may be arbitrary.

Here, when the ratio of Fe and Co is represented by:

$$Fe_{1-z}Co_z,$$

embodiment 3 holds good, when:

$$0.07 \leq z \leq 0.43$$

[Embodiment 4]

On a transparent substrate, a magneto-optical media is produced by laminating the first protective film for $L_1$ Å, a recording film for 170 Å, the second protective film for 200 Å, and a reflecting film for 600 Å. The first and second protective films are made of AlSiN, SiN, or $SiO_2$ each having a refractivity between 1.95 and 2.05. The recording film is made of NdDyFeCo or NdDyTbFeCo. The reflecting film is made of AlTi, AlCr, or AlTa. The phase of the magneto-optical head is changed to read the magneto-optical media by using a babinet soleile plate in the magneto-optical head. The environmental temperature is set at 55° C. The phase of the head where the S/N ratio of the read signals shows the peak is denoted as the phase $P_h$ which is also the phase difference of the magneto-optical media at the environmental temperature. Also, the value of the lowest S/N ratio within ±15 degrees phase difference of the head is denoted as $S_w$. The relationship between the thickness $L_1$ of the first protective film and $P_h$ and $S_w$ is shown in FIG. 16. From FIG. 16, it is shown that $P_h$ can be restrained to be within ±5 degrees and $S_w$ is more than 45 dB when $L_1$ is between 400 Å and 700 Å.

[Embodiment 5]

Embodiment 5 has the same media structure as that of Embodiment 4 illustrated in FIG. 16, except that the first protective film has a thickness of 600 Å and the second protective film has a thickness of $L_2$ Å. The relationship between the thickness $L_2$ of the second protective film and $P_h$ and $S_w$ under the same conditions as described above in connection with Embodiment 4 is shown in FIG. 17. From FIG. 17, it is shown that $P_h$ can be restrained within ±5 degrees and $S_w$ is more than 45 dB when $L_2$ is less than 250 Å.

Next, the relationship between the thickness $L_2$ of the second protective film and the recording laser power $P_1$ at the time when the S/N ratio reaches 45 dB is described. The linear velocity at the time of recording is 15 m/sec. At this time, the phase difference of the magneto-optical head is set to 0 degree, and the environmental temperature is 55° C. In FIG. 18, $L_2$ is taken on the abscissa, and $P_1$ on the ordinate. $P_1$ can be restrained to be less than 6 mW, when $L_2$ is more than 150 Å, and that the signals can be effectively recorded with low laser power.

[Embodiment 6]

Embodiment 6 has the same media structure as that of Embodiment 4 illustrated in FIG. 16 except that the first protective film has a thickness of 600 Å and the reflecting film has a thickness of $L_r$ Å. The relationship between the thickness $L_r$ of the reflecting film and $P_h$ and $S_w$ under the same conditions as described above in connection with Embodiment 4 is shown in FIG. 19. As shown $P_h$ can be restrained within ±5 degrees and $S_w$ is more than 45 dB when $L_r$ is more than 400 Å.

Next, the relationship between the thickness $L_r$ of the reflecting film and the recording laser power $P_1$ at the time when the S/N ratio reaches 45 dB is described. The linear velocity at the time of recording is 15 m/sec. At this time, the phase difference of the magneto-optical head is set to 0 degree, and the environmental temperature is 55° C. In FIG. 20, $L_r$ is taken on the abscissa, and $P_1$ is taken on the ordinate. $P_1$ can be restrained below 6 mW, when $L_r$ is less than 800 Å, and that magneto-optical signals can be effectively recorded with a low laser power.

[Embodiment 7]

In the magneto-optical media of the invention, when the light is impinged through the transparent substrate to the recording layer and the reflecting layer, the following relationships are established, with the Kerr rotation angle of the Kerr effect reproduced light denoted by $\theta$, Kerr elliptic ratio by $\epsilon$, reflectivity by R (%), and the phase difference between the impinging polarized light and the light in the direction perpendicular to that of the impinging polarized light by $\delta$:

$$\delta = ARC\ TAN\ (\epsilon/\theta)$$

and $$Q = |R \cdot SIN\ \theta \cdot COS 2\delta|.$$

Also, when the phase difference of the magneto-optical head is changed within ±15 degrees, the lowest S/N ratio is denoted as $S_w$. Here, ±15 degrees corresponds to the maximum value of the phase difference fluctuation of the mass produced drive.

FIG. 21 shows the relationship between Q and $S_w$. As shown the S/N ratio of more than 45 dB, which is necessary for stable recording and reading in the mass produced drive, can be obtained when Q is more than 0.3.

In the signal detecting system of the magneto-optical head, the phase difference δ between the impinging polarized light (P polarized light) and the light (S polarized light) having a direction perpendicular to that of the impinging polarized light is related to the Kerr rotation angle θ and the Kerr ellipticity ε, and can be represented by:

$$\delta = ARCTAN\ (\epsilon/\theta).$$

The smaller ε is for a constant θ, the nearer δ becomes 0. The reproduced S/N ratio of the magneto-optical media is proportional to log Q, and Q can be represented as:

$$Q = |R \cdot SIN\theta \cdot COS2\delta|$$

If the Kerr rotation angle is of a certain value, when the Kerr ellipticity is large, the phase difference δ is generated in the magneto-optical media, decreases index Q, and lowers the S/N ratio.

Therefore, in order to obtain high S/N ratio, the refractivity and film thickness of the respective layers of the multi-layered thin film of the magneto-optical media must be optimized to achieve a large θ and a small ε. It is also necessary that each layer has the optimum protective characteristics and heat conducting characteristics. Especially, when the high density recording is considered, in order to obtain a high stable S/N ratio with micro recording pits, the medium design described above is necessary.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

We claim:

1. A magneto-optical media comprising a multi-layered film including a transparent substrate, a first protective layer, a recording layer, a second protective layer and a reflecting layer which are laminated in order; wherein the first protective layer has a thickness between 400 Å and 700 Å, the recording layer has a thickness between 150 Å and 300 Å, which is constituted of alloy of rear earth and transition metals, the second protective layer has a thickness between 150 Å and 250 Å, and the reflecting layer has a thickness between 400 Å and 800 Å.

2. The magneto-optical media of claim 1, wherein the composition of said recording layer is expressed by $$Nd_x Dy_y (FeCo)_{100-x-y},$$

where $25 \leq x+y \leq 30$ and $0 \leq x \leq 8$, in atomic percentage.

3. The magneto-optical media of claim 1, wherein the composition of said recording layer is expressed by $$Nd_x (DyTb)_y (FeCo)_{100-x-y},$$

where $25 \leq x+y \leq 30$ and $0 \leq x \leq 8$ in atomic percentage.

4. The magneto-optical media of claim 1, further comprising another film disposed on another substrate and having a structure substantially identical with that of said multi-layered film and an adhesive layer disposed between the respective reflecting layers of said another film and said multi-layered film for pasting said another film and said multi-layered film together.

5. The magneto-optical media of claim 2, wherein $20 \leq y$ in atomic percentage.

6. The mageto-optical media of claim 3, wherein $20 \leq y$ in atomic percentage.

7. The magneto-optical media of claim 1, wherein the refractivity of the first and second protective layers is between 1.95 and 2.05.

8. The magneto-optical media of claim 1 wherein the first and second protective layers are made of any one of AlSiN and SiN.

9. The magneto-optical media of claim 1, wherein the reflecting layer is made of Al alloy.

10. A method for manufacturing magneto-optical media, comprising the steps of:

disposing a first protective layer on a transparent substrate, said first protective layer having a thickness between 400 Å and 700 Å;

disposing a recording layer on said first protective layer, said recording layer having a thickness between 150 Å and 300 Å, the recording layer being constituted of alloy of rare earth and transition metals;

disposing a second protective layer on said recording layer, said second protective layer having a thickness between 150 Å and 250 Å; and disposing a reflecting layer on said second protective layer, said reflecting layer having a thickness between 400 Å and 800 Å.

11. The method of claim 10, wherein the composition of said recording layer is expressed by $$Nd_x Dy_y (FeCo)_{100-x-y},$$

where $25 \leq x+y \leq 30$ and $0 \leq x \leq 8$, in atomic percentage.

12. The method of claim 10, wherein the composition of said recording layer is expressed by $$Nd_x (DyTb)_y (FeCo)_{100-x-y},$$

where $25 \leq x+y \leq 30$ and $0 \leq x \leq 8$ in atomic percentage.

13. The method of claim 10, further comprising the steps of:

disposing an adhesive layer on said reflecting layer;

disposing a second reflecting layer on said adhesive layer, said second reflecting layer having a thickness between 400 Å and 800 Å;

disposing a third protective layer on said second reflecting layer, said third protective layer having a thickness between 150 Å and 250 Å;

disposing a second recording layer on said third protective layer, said second recording layer having a thickness between 150 Å and 300 Å and being constituted of alloy of rare earth and transition metals;

disposing a fourth protective layer on said second recording layer, said fourth protective layer having a thickness between 400 Å and 700 Å; and disposing a second transparent substrate on said fourth protective layer.

14. The method of claim 11, wherein $20 \leq y$ in atomic percentage.

15. The method of claim 12, wherein $20 \leq y$ in atomic percentage.

16. The method of claim 10, wherein the refractivity of the first and second protective layers is between 1.95 and 2.05.

17. The method of claim 10, wherein the first and second protective layers are made of any one of AlSiN and SiN.

18. The method of claim 10, wherein the reflecting layer is made of Al alloy.

* * * * *

UNITED STATES PATENT AND TRADEMARK OFFICE
CERTIFICATE OF CORRECTION

PATENT NO.       : 5,667,887
DATED            : September 16, 1997
INVENTOR(S)      : Hiromu Miyazawa, et al.

It is certified that errors appear in the above identified patent and that said Letters Patent is hereby corrected as shown below:

Title page, item 54, Title, change Magneto-Optical Media" to --Magneto-Optical Media and Method for Manufacturing Same--.

Title page, item 63, Related U.S. Application Data, change "Mar. 29, 1990" to --Mar. 28, 1990--.

Column 1, line 4, change "Mar. 29, 1990" to --Mar. 28, 1990--.

Column 9, line 45 change "rear" to --rare--.

Signed and Sealed this

Fifth Day of May, 1998

Attest:

BRUCE LEHMAN

*Attesting Officer*        *Commissioner of Patents and Trademarks*